June 1, 1943.  J. L. SCHWARTZ  2,320,753
THERMOMETER
Filed May 7, 1941
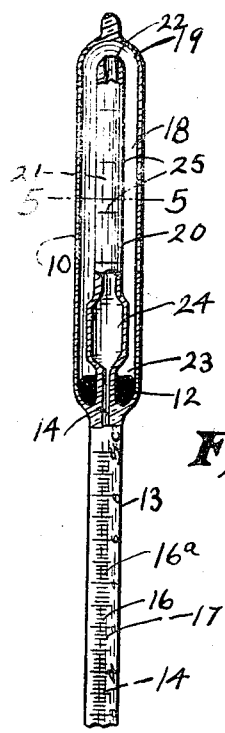
Fig. 1.
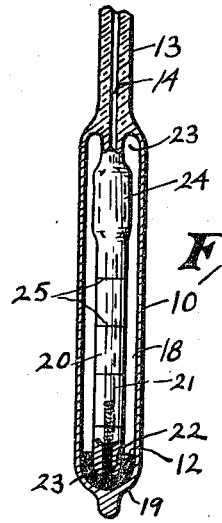
Fig. 2.
Fig. 3.
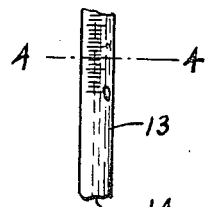
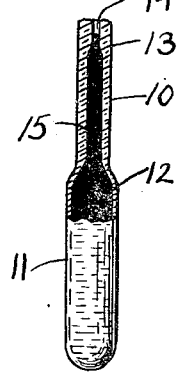
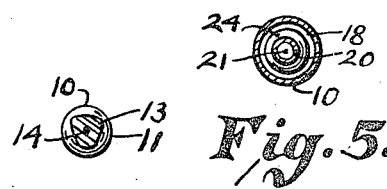
Fig. 5.
Fig. 4.
Inventor,
John Leonard Schwartz,
by his attorney.
J. Edward Thebaud Patented June 1, 1943

2,320,753

UNITED STATES PATENT OFFICE 2,320,753

THERMOMETER

John Leonard Schwartz, Philadelphia, Pa., assignor to Philadelphia Thermometer Company, Philadelphia, Pa., a copartnership composed of John Leonard Schwartz, Clarence Rossman, and Hugo Englehardt Application May 7, 1941, Serial No. 392,203

4 Claims. (Cl. 73—371)

This invention relates to differential thermometers.

During laboratory tests and research work, on bacteria, as well as on chemical or other substances, a differential thermometer is used for accurately determining temperatures, within certain ranges, at different degrees of temperature, involved in the work or tests.

One of the objects of my invention is to provide a differential thermometer having that part of the stem, where the reading is to be taken, include a very fine mercury (or other fluid) bore, so as to have on an adjoining scale, a range of a few degrees of calibration, with as much spacing between consecutive degrees, as is possible, and thus afford opportunity to have a greater number of scale sub-division of each degree, into smaller fractions thereof, for direct observation.

Inasmuch as it is desirable to add to or shorten the mercury column, so as to bring its top to come, for a given temperature, within the range of the said fixed, finely divided scale, on the stem, for the few degrees thereof, another object of my invention is to provide a reservoir which will be in open communication with the bore of the stem, for either receiving or supplying the mercury or other bore fluid, when changing the column length, to bring its top where desired.

A further object is to locate said reservoir at the upper end of the main stem, where a continuation, as a tubular extension to the main stem and its bore, can project up into the said reservoir, the walls of which will then surround this stem extension and form an annular pocket in the lower part of said reservoir, where mercury or other column fluid can lodge, when the thermometer is held upright.

Another object is to form said stem extension into a measuring device, by calibrating it into degrees, corresponding to those of the scale below, but in order to have the stem extension degree markings much closer together and make use of a shorter stem extension, another object is to have the bore of this stem extension much larger in diameter than that of the fine bore, of the main stem below.

Another object is to have the said reservoir and the mercury column, under considerable gas pressure, in order to maintain the continuity of the fine mercury column of the thermometer, and in this connection, a further object is to have in the bore of the stem extension, between the graduated portion thereof and the main stem, an enlarged portion, serving as a co-axial chamber to said extension bore, to afford opportunity for mercury to pass through this chamber, permitting the gas to come up above the mercury, to be in direct connection with the gas in the reservoir.

A further object is to have that portion of the main stem bore, adjoining the thermometer bulb, enlarged, and open directly into the hollow of the bulb, so as to receive, for a short distance, the mercury during the lower degrees of expansion, and thus make a shorter thermometer possible, while at the same time, affording an easier exit of the mercury from the thermometer bulb, to reduce any shock that might come from suddenly increasing the mercury temperature, in the bulb.

With these and other objects which will hereinafter appear, one embodiment of my invention is illustrated in the drawing, the construction is described, its functioning is explained, and what I claim is set forth.

In the drawing,

Figure 1 is an upright elevation of a differential thermometer, embodying my invention, and is shown in fragmental lengths partly broken away to illustrate the inner construction.

Figure 2 is an inverted elevation, partly broken away, showing the upper, reservoir end of the thermometer, similar to that shown in Figure 1.

Figure 3 is an inclined sectional elevation of the upper portion, of the thermometer shown in Figure 1.

Figure 4 is a section taken on the line 4—4, of Figure 1.

Figure 5 is a section taken on the line 5—5, of Figure 1.

In the figures, 10 is the differential thermometer having the usual bulb 11, containing the mercury 12, and 13 is the solid glass, main stem of the thermometer, having a bore 14. The lower portion 15, of the bore 14, next to bulb 11, is enlarged. The upper portion 16, of the main stem 13, is calibrated to form a scale 16a, and within the portion 16, of the stem, is a fine bore portion 17. It will be noticed that the individual degree markings, on the scale 16a, are unusually far apart, permitting a greater number of sub-divisions for small fractions of degrees. Although fifty sub-divisions per degree are shown, any number of sub-divisions per degree, can be made as desired, bearing in mind their readability, with or without the use of a microscope.

While the number of full degrees shown is five, any umber of degrees can be provided for.

Surmounting the main stem 13, and integral therewith, is the closed reservoir 18, shown cylindrical and co-axially, integral with the main stem 13. This reservoir may be of any other shape desired, and be differently positioned. Running up into the reservoir 18, to near its top end 19, is an auxiliary tubular stem 20, integral with the stem 13, having its bore 21 continuous with the bore 14 below. The upper end 22, of the bore 21, opens into the reservoir 18. In the lower part of the reservoir 18, where the auxiliary stem 20 enters, there is formed an annular pocket 23, where mercury, or other stem fluid can lodge, to be added to, when the mercury column is shortened, or drawn upon, when the said column is lengthened.

The bore 21, of the auxiliary stem 20, has a portion in its lower part formed into a chamber 24, comparatively much larger in diameter than that of the bore 21. From this chamber 24, to the upper end of the stem 20, the bore 21 is uniform in diameter, and its diameter is larger than that of the bore 14, of stem portion 16. The stem 20 has degree calibrations 25, shorter per degree than the degree spacing on the scale of the stem portion 16, on account of its larger bore. Inasmuch as the calibrated stem 20 is to be used in measuring portions of mercury within its bore, and such portions of mercury need only approximate what is to be added to, or taken from, the main stem column, there is not so much need for fine sub-divisions, as there is on the stem portion 16, where the readings indicated, are more for fractional changes in temperature, within a given range.

When manufacturing the thermometer 10, the reservoir 18 is filled with some gas under considerable pressure, which is sealed in, to bear down on the mercury column in the stem portion 16.

With the construction above described, an operator is able to add mercury to, or take it from, the main bore, of the thermometer, in the following manner: suppose he desires to shorten the mercury column, he then holds the thermometer upright and heats the bulb 11 carefully, and watches the column rise, until mercury enters as a small bead, in the bottom part of the chamber 24; then before it has had a chance to cool much, he jolts this bead away from the mercury column, to cause it to lodge in the upper part of the chamber 24. Once he has succeeded in doing this, he again heats the bulb 11, causing the long mercury column to rise and compress the small amount of gas in the chamber 24, forcing the said bead up into the bore of the calibrated part, of the auxiliary stem 20, as at 12a, of Figure 3, where he can ascertain in degrees and parts thereof, the amount of mercury he has thus dislodged from the main mercury column. After thus separating this portion of the mercury from the column, the bulb 11 is further heated and the mercury portion 12a, which is lodged in the calibrated part, of the auxiliary stem 20, is forced out into the reservoir 18, where it drops to the pocket 23. If now, the operator wants to draw off more mercury from the column, he repeats the operation, beginning by separating off another bead of mercury, which he forces, as above explained, into the reservoir 18.

If, on the other hand, he wants to add to the column of mercury, he first heats the bulb 11, and immediately inverts the thermometer to have the mercury drop from the pocket 23, into the end 19, of the reservoir, as shown in Figure 2, and cause the auxiliary stem end 22, to be immersed in mercury, then as the bulb 11 cools, he observes how many degrees of mercury is sucked up into the bore 21, of the stem 20. When he has thus sucked up the portion of mercury he wants to add to the column, he turns the thermometer right side up, with the drawn-in portion of mercury lodged in the tubular stem 20. By jolting, he causes this mercury portion to drop into the chamber 24, to be added to the mercury column of the main stem, at the same time, the confined gas is given a chance to get above the mercury and get in free communication with the gas in the reservoir 18.

Inasmuch as changes in the construction of the thermometer as shown and described, can be made without departing from the spirit of my invention, I desire to include all modifications thereof which come within the scope of the following claims.

I claim:

1. A differential thermometer comprising in combination, a hollow bulb, a main stem, with a bore in said stem connected with the inside of said bulb, there being mercury or other expandable fluid within said bore and said bulb, a lower portion to said bore, opening directly into said bulb, having a comparatively enlarged section, an upper portion to said stem having an exceedingly fine length of bore, a scale adjoining said last mentioned length of bore, having finely divided subdivisions per degree, and a closed reservoir at the top of said main stem in open communication with said bore, said reservoir being in line with said stem, an open ended, auxiliary tubular stem forming an extension to said main stem, running up into said reservoir, forming with the walls of said reservoir, an annular, surrounding pocket at the lower end of the said reservoir, for receiving an excess of the thermometer fluid, expelled from the open end of said auxiliary, tubular stem, said reservoir containing gas under pressure and an expanded portion to the bore of said auxiliary, tubular stem at its lower end, forming a chamber through which portions of expandable fluid can pass between the main bore of the auxiliary, tubular stem and the bore in the main stem and allow any confined gas to arise above the expandable fluid portion dropped therein from above and come in free communication with the gas in the reservoir.

2. A differential thermometer comprising in combination a hollow bulb, a main stem having a bore opening into said bulb, there being an expandable fluid within said bore and said bulb, the lower portion of said main stem bore having a comparatively enlarged section, an upper portion to said main stem having a length of bore with a reduced section, a first scale having finely sub-divided divisions per degree, adjoining said reduced section of bore, a closed reservoir at the upper end of said main stem, an open ended, auxiliary, tubular stem, forming an extension to said main stem, running up into said reservoir and spaced from the walls thereof, whereby to form an annular pocket about said stem extension, for the reception of thermometer fluid exuded from said extension, the bore of said auxiliary stem opening into said reservoir, and having a section at its lower part larger than that of the bore in the upper part of said main stem, and a second scale of degrees next to said enlarged bore, of said auxiliary stem, the degree markings on said second scale being closer than the degree markings on said first scale.

3. A differential thermometer comprising in combination a hollow bulb, a main stem having a bore opening into said bulb, there being an expandable fluid within said bore and said bulb, a portion of said main stem having a length of bore with a reduced section, a first scale having finely sub-divided divisions per degree adjoining said reduced section of bore, a closed reservoir at the upper end of said main stem, an open ended, auxiliary, tubular stem, forming an extension to said main stem, running up into said reservoir and spaced from the walls thereof, whereby to form an annular pocket about said stem extension, for the reception of thermometer fluid exuded from said extension, the bore of said auxiliary stem opening into said reservoir, and having a section larger at its lower end than that of the bore in the upper part of said main stem, and a second scale of degrees next to said enlarged bore, of said auxiliary stem, the degree markings on said second scale being closer than the degree markings on said first scale.

4. A differential thermometer comprising in combination a hollow bulb, a main stem having a bore opening into said bulb, there being an expandable fluid within said bore and said bulb, a portion of said main stem having a length of bore with a reduced section, a first scale having finely sub-divided divisions per degree adjoining said reduced section of bore, a closed reservoir at the upper end of said main stem, containing gas under pressure, an open ended, auxiliary, tubular stem, forming an extension to said main stem, running up into said reservoir and spaced from the walls thereof, whereby to form an annular pocket about said stem extension, for the reception of thermometer fluid exuded from said extension, the bore of said auxiliary stem opening into said reservoir, and having a section larger at its lower end than that of the bore in the upper part of said main stem, and a second scale of degrees next to said enlarged bore, of said auxiliary stem, the degree markings on said second scale being closer than the degree markings on said first scale.

JOHN LEONARD SCHWARTZ.